United States Patent

Thirion De Briel et al.

[11] Patent Number: 5,355,985
[45] Date of Patent: Oct. 18, 1994

[54] CLUTCH FRICTION WHEEL, ESPECIALLY FOR A MOTOR VEHICLE CLUTCH

[75] Inventors: Jacques Thirion De Briel, Colombes; André Dalbiez, Argenteuil, both of France

[73] Assignee: Valeo, Paris, France

[21] Appl. No.: 77,412

[22] Filed: Jun. 16, 1993

[30] Foreign Application Priority Data

Jun. 18, 1992 [FR] France .................. 92 07405

[51] Int. Cl.$^5$ ........................... F16D 13/60
[52] U.S. Cl. .................. 192/107 C; 192/107 R
[58] Field of Search ............. 192/107 C, 107 R, 52

[56] References Cited

U.S. PATENT DOCUMENTS

| | | | |
|---|---|---|---|
| 2,195,665 | 4/1940 | Wolfram | 192/52 X |
| 2,541,296 | 2/1951 | Saks | 192/107 C |
| 2,566,394 | 9/1951 | Zeidler | 192/107 C |
| 2,597,911 | 5/1952 | Thelander | 192/107 C |
| 4,108,699 | 8/1978 | de Gennes | 192/107 C X |
| 4,422,539 | 12/1983 | Werner | 192/107 C |
| 4,671,399 | 6/1987 | Ooga | 192/107 C |
| 4,714,148 | 12/1987 | Alas et al. | 192/107 C |
| 4,869,356 | 9/1989 | Cameron | 192/107 M |
| 4,993,531 | 2/1991 | Villata | 192/107 C |
| 5,048,659 | 9/1991 | Tojima | 192/107 C |
| 5,174,426 | 12/1992 | Thirion de Breil et al. | 192/107 C |

FOREIGN PATENT DOCUMENTS

| | | |
|---|---|---|
| 2670548 | 6/1992 | France . |
| 9115999 | 6/1993 | France . |
| 459006 | 2/1935 | United Kingdom . |

Primary Examiner—Charles A. Marmor
Assistant Examiner—Andrea Pitts
Attorney, Agent, or Firm—Longacre & White

[57] ABSTRACT

A clutch friction wheel for a motor vehicle clutch comprises a support having slotted lobes projecting radially from an inner portion of the support. Friction pads are arranged back-to-back on either side of each lobe. Springs are interposed between two associated friction pads. The springs consist of profiled fins such as to define a wavy support having, for contact with one friction pad of each pair, a central zone having free circumferential end portions, and, for contact with the other friction pad of the same pair, marginal portions. One of these marginal portions projects from and is integral with the inner portion of the support.

8 Claims, 4 Drawing Sheets

CLUTCH FRICTION WHEEL, ESPECIALLY FOR A MOTOR VEHICLE CLUTCH

FIELD OF THE INVENTION

The present invention relates to a clutch friction wheel, especially for a motor vehicle clutch, of the type comprising a support of generally annular form and carrying flat friction liners, which are divided into radial friction pads arranged back-to-back and lying respectively on either side of the support.

BACKGROUND OF THE INVENTION

In the specification of French patent application No. 91 5999 filed on 23 Dec. 1991, it has already been proposed to provide an arrangement with a support which is provided with slotted lobes projecting radially from an internal annular crown, with each lobe carrying a friction liner that consists of two friction pads arranged back-to-back and adapted to act on either side of a common lobe.

Resilient means, which are fitted in slots in the lobes, are arranged with each resilient means between two associated friction pads. These resilient means consist essentially of an elastically deformable metallic element which is arranged to be squeezed between two friction pads.

One of the friction pads is fixed on to a lobe by means of two shouldered pins, while the other pad is mounted so as to float, by means of a loose mounting on the shouldered pins. In this way it is adapted to follow, as well as possible, any conical deformation of the pressure plate of the clutch that results from the effects of heat which is produced, in particular, by friction with the friction pads. In this way equal wear of the pads is obtained, without progressive offset towards the axis of rotation of the zone along which the friction liners are subjected to the pressure from the pressure plate and reaction plate of the clutch.

In the above mentioned document, the resilient elements are carried on the lobes, and are separate components from the latter. However, it has been thought that these resilient means may be made integral with the support.

DISCUSSION OF THE INVENTION

An objection of the present invention is to provide a way of achieving this result.

According to the invention, a clutch friction wheel, especially for a motor vehicle, comprising: a support having slotted lobes projecting radially from an inner portion; a plurality of friction liners, each of which comprises a pair of pads disposed back-to-back on either side of a common said lobe; and resilient means, each of which is interposed between two associated friction pads and disposed in the slots of the lobes, wherein one of the said friction pads of each pair is fixed to the associated slotted lobe through two shouldered pins, while the other said friction pad of the same pair is mounted for movement, with a clearance, on the two said shouldered pins, is characterised in that the resilient means consist of profiled fins projecting from the said inner portion of the support, so as to define a wavy support having, for contact with one of the said friction pads of each pair, a central zone with free circumferential end portions and, for contact with the other friction pad of the same pair, marginal zones, with one of the said marginal zones projecting integrally from the internal portion of the support.

In a clutch friction wheel according to the invention, the said resilient means are made in a simple and inexpensive manner, and the friction pads are afforded good mobility so as to be able to adapt to the conical deformation of the pressure plate. In this connection, the provision of the marginal zones enables each profiled fin to be made integral with the support, while the more flexible free end portions of the corresponding central zone enable the associated friction pad to be mounted in a floating manner. The profiled fins also enable good progressivity to be obtained during the operation of engaging the clutch.

It will be appreciated that the central zone enables good surface contact of the associated friction pad to be obtained under all circumstances, and that the material necessary for forming the support is used to the best advantage. In this connection, in normal current practice, formation of the lobes involves a loss of material in forming the slots in the latter. The invention enables this material to be used so as to form the progressively operating profiled fins which are provided in accordance with the invention.

The fins, thus profiled, define a wavy support, and the central zone of each fin is preferably in the form of an H. This configuration enables the friction pads to be given good mobility, especially in the transverse direction with respect to a line passing through the two securing pins. This line preferably constitutes the axis of symmetry at the central zone. This arrangement increases still further the transverse mobility of the friction pad.

Further features and advantages of the invention will appear more clearly on a reading of the detailed description of a preferred embodiment of the invention which follows, and which is given by way of example only and with reference to the accompanying drawings.

DESCRIPTION OF A PREFERRED EMBODIMENT OF THE INVENTION

Figure 2:
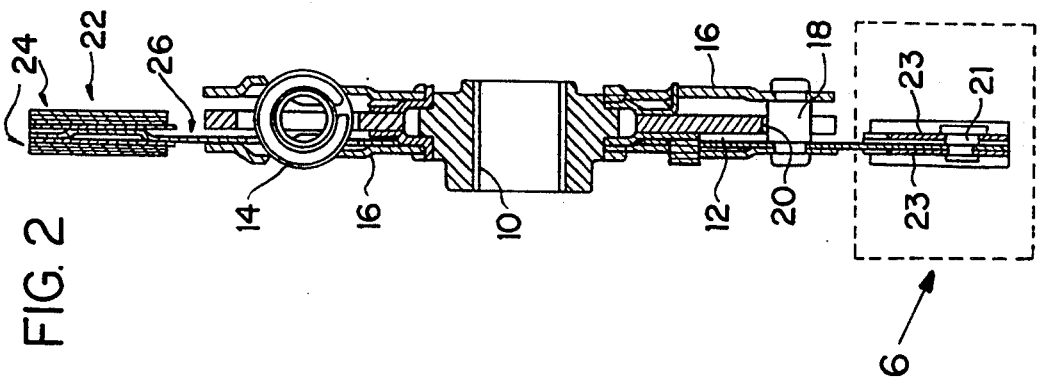
FIG. 2 is a view in axial cross section taken on the line 2—2 in FIG. 1.
Figure 1:
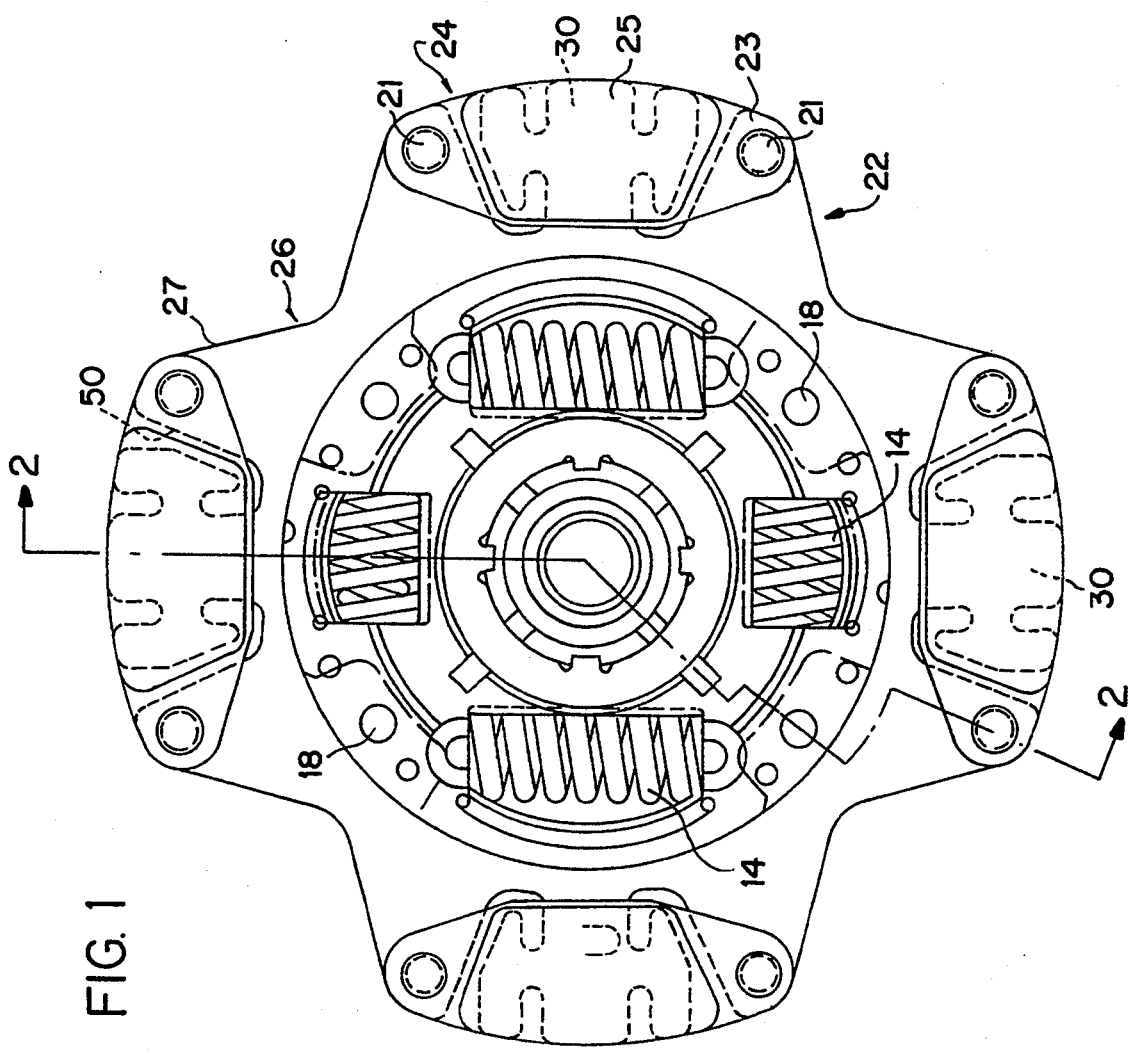
FIG. 1 is a view in elevation of a clutch friction wheel for a motor vehicle.

The assembly shown in FIGS. 1 and 2 comprises a hub 10 having a radial plate or hub plate 12, which is fixed to the hub 10 for rotation with the latter, in this example by a splined coupling. In a modification, the hub plate may be secured on the hub by force-fitting. The assembly constitutes a clutch friction wheel for a motor vehicle, in which the hub 10 is arranged to be carried on the input shaft of the gearbox, with which it is rotatable through a splined connection.

Figure 6:
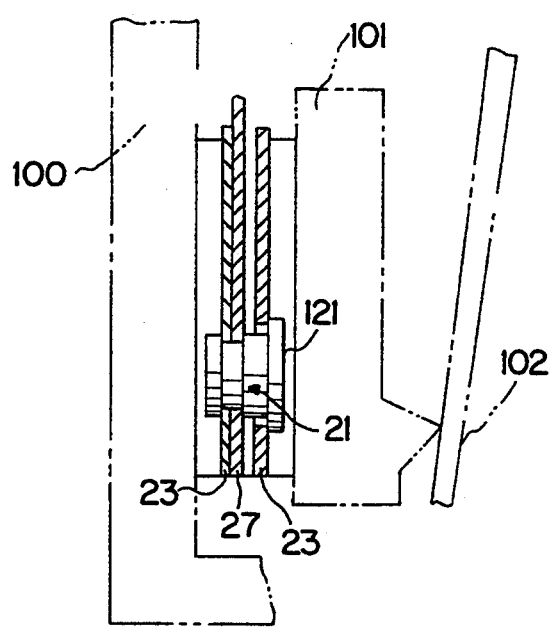
FIG. 6 is an enlarged scrap view of the portion enclosed within the broken rectangle at 6 in FIG. 2.

Circumferentially acting resilient means 14 couple the hub 10 to a part of the damper comprising two guide rings 16 which are arranged on either side of the hub plate 12, and which are secured to each other by means of spacers 18. The spacers 18 pass through slots 20 formed in the hub plate 12. In this example, the resilient means 14 consist of coil springs, which are accommodated partly in windows formed in the guide ring 16, and partly in windows formed in the hub plate 12. The spacers 18 also serve for securing a clutch friction wheel or disc 22, generally annular in shape and comprising an annular support 26, with friction liners 24 secured on opposite faces of the support 26. The liners 24 are arranged to be gripped between the reaction plate 100 and the pressure plate 101 (FIG. 6) of the clutch, these plates 100 and 101 being secured to the crankshaft of the engine of the vehicle for rotation with the crankshaft.

Figure 3:
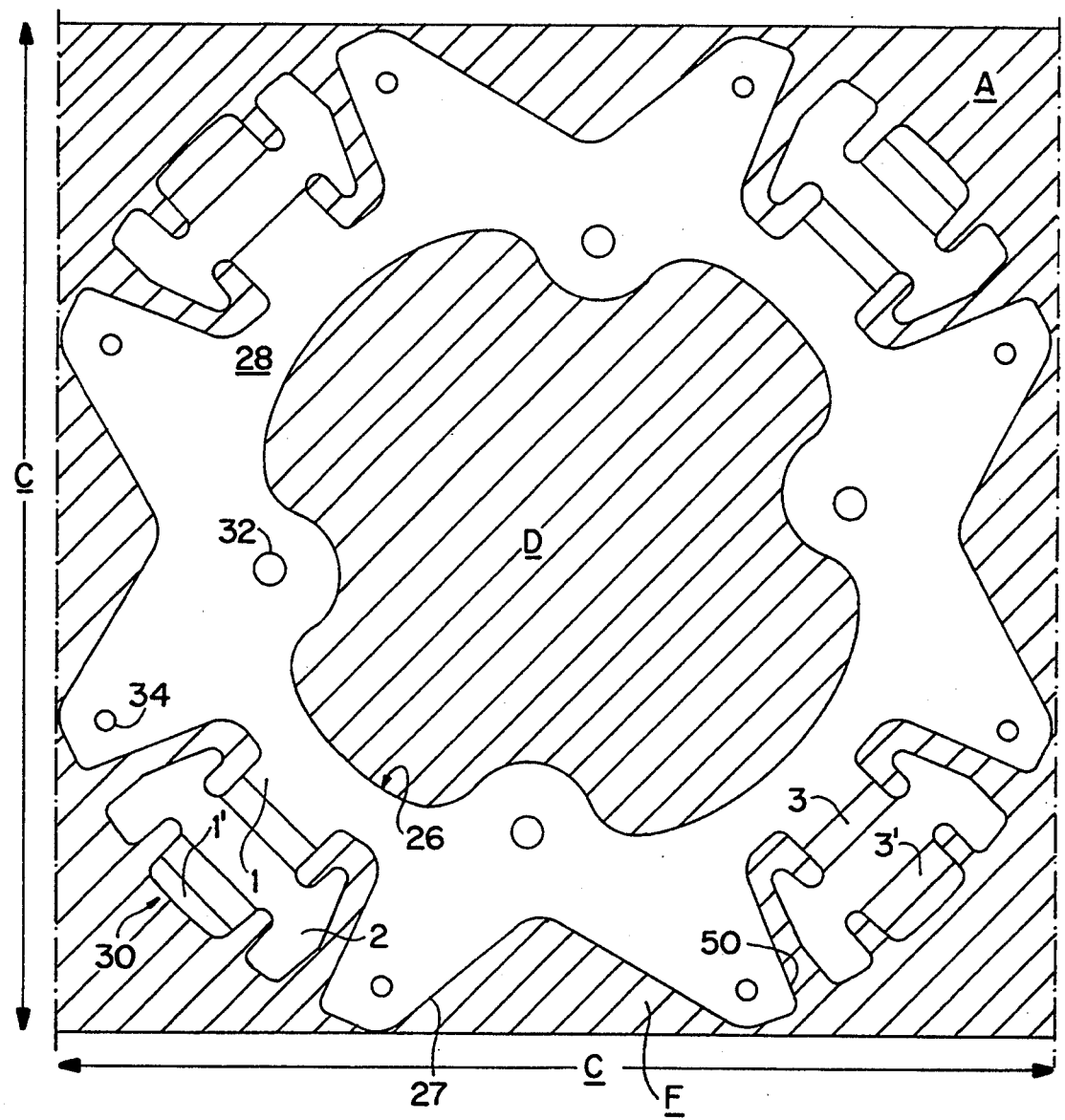
FIG. 3 is a view in elevation showing a support of the clutch friction wheel.

Referring now to FIG. 3, this shows a version of the annular support 26 which is made in one piece by a press operation from a flat sheet metal blank F. This support 26 is less thick than the hub plate 12 and the guide rings 16. The support 26 is generally annular in shape and consists essentially of an inner portion in the form of an internal annular crown 28, with four resiliently deformable profiled fins 30 being formed integrally with the internal crown 28. These fins 30 extend radially outwardly from the crown 28, and are spaced apart circumferentially at regular intervals on the outer periphery of the support 26. These fins 30 are formed on four radial lobes 27, which are again integral with the crown 28 from which they extend radially outwards and on which they are arranged circumferentially at regular intervals. Slots 50 are also formed in the lobes 27 during the pressing operation.

Figure 5:
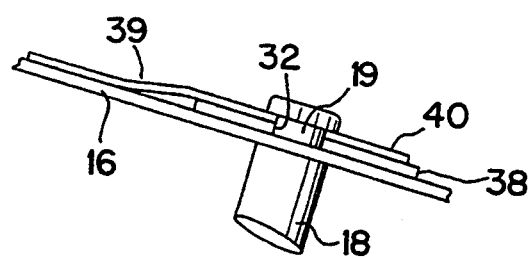
FIG. 5 is a scrap view, seen in cross section taken on the line 5—5 in FIG. 4.

The crown 28 has four holes 32 which are spaced apart at regular intervals on a common pitch circle. These are the mounting holes for the friction disc 22 (FIG. 1). To this end, as can be seen in FIG. 5, portions 19 of the spacers 18, of reduced diameter, fit in the holes 32. FIG. 3 shows a set of tongues 29, one of which is associated with each mounting hole 32. These tongues 26 project radially inwards at the inner periphery of the crown 28, and are of rounded form.

In the present case the fins 30 are profiled in such a way as to constitute a wavy support (otherwise referred to as a progressive support), in which each fin 30 engages with one of the clutch friction liners 24 in a zone 1, 1' (see FIG. 7), while it engages with the other one of the associated liners 24 through a central zone 2, which is offset axially from the zone 1, 1'. In the present example, the friction liners 24 are divided into separate pads, which are associated with each other in pairs and which are mounted on the slotted lobes 27. These friction pads 24 are arranged back-to-back, so as to act on either side of the support 26. In this example, each friction pad comprises a metallic carrier element 23 which is overlaid by a friction material 25 secured to the carrier element by brazing or by a suitable adhesive (see FIGS. 1 and 6). The friction pads 24 of each pair thus lie on either side of a respective one of the lobes 27.

The friction liners are secured on the support 26 by means of stepped rivets or shouldered pins 21, which pass through holes 34 (FIG. 7) formed symmetrically on a common pitch circle close to the outer periphery of the lobes 27 of the support 26. In each lobe, the holes 34 are arranged as a pair on either side of the fin 30 and slots 50 of the lobe.

Figure 7:
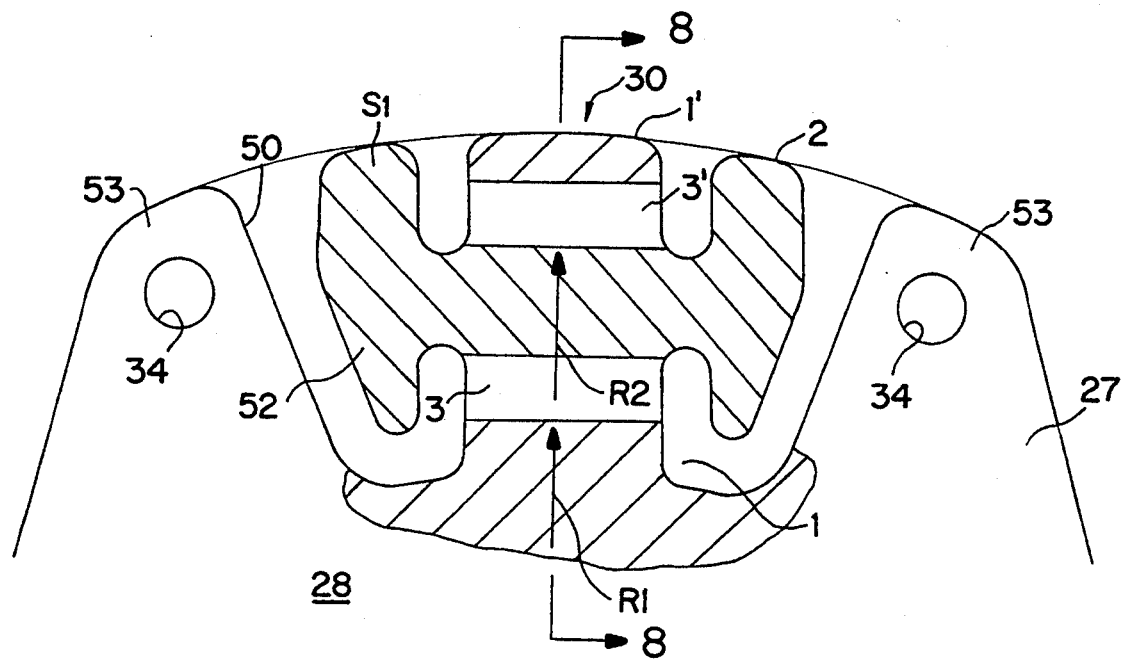
FIG. 7 is an enlarged scrap view showing a lobe having a profiled fin in accordance with the invention.

As can be seen in FIGS. 1 and 7, the fins 30 are cut out centrally in the lobes 27, and extend axially between the friction material 25 of one pad and that of the other, with the carrier elements 23 of the friction pads 24 circumferentially overlapping the fins 30, so as to be secured to each other by the associated rivets 21, each passing through the associated lobe via its holes 34. More precisely, the shouldered pins 21 enable the pads 24 which face towards the reaction plate 100 to be secured to the fins 30 through their carrier elements 23; while the other pads 24, i.e. those facing towards the pressure plate 101, are engaged loosely on the pins 21 so that their carrier elements are mounted in a floating manner. The head 121 of each pin 21 constitutes a shoulder and an abutment means which limits the axial displacement of the associated support element 23, and therefore of the relevant friction pad.

Figure 8:
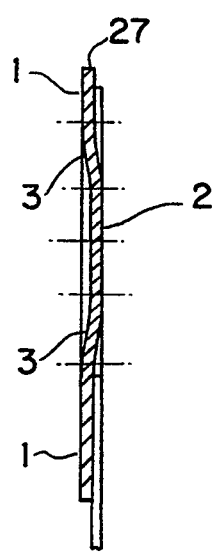
FIG. 8 is a view in cross section taken on the line 8—8 in FIG. 7.

It will be noted that the engagement zones 1, 1' and 2, offset axially from each other, are joined together through inclined zones in the form of a parallel folds 3, 3', oriented tangentially. The central zone 2 is generally H shaped, while the zone 1, 1' is divided into two marginal zones 1, 1' which extend on either side of the horizontal portion of the H, to which they are joined through the inclined zones 3, 3' seen in FIGS. 3 and 8. These inclined zones 3 and 3' are inclined in opposite directions. They extend tangentially with respect to concentric arcs, of radius R1 and R2 respectively, which are centred on the axis of the assembly, so that these inclined junction zones are parallel to the longitudinal direction of the friction pads 24.

The same is true of the central zone 2 itself, in which the horizontal portion extends parallel to the longitudinal direction of the pads 24, while its vertical portions, which define circumferential free ends of the central zone, extend generally at right angles to the horizontal portion. The zones 1 and 1' are offset axially from the central portion 2, and lie in the same plane as the crown 28.

Thus, one of the friction pads 24 can follow the movement in deformation of the pressure plate 101 (i.e. its tendency to assume a conical shape under the effect of heat), by virtue of the clearance which is defined between the carrier element 23 of the pad and the associated shouldered pins 21. The pressure plate 101 is normally subjected to the action of a diaphragm indicated in broken lines at 102 in FIG. 6. In this way, the friction pad is mounted for axial movement on its two associated shouldered pins 21 (on that part of the latter having the largest diameter), with the heads 121 of these pins defining the maximum axial spacing between the two support elements 23 of the associated friction pads 24. The pad is also able to pivot transversely about a line which passes through the centre of the two associated pins 21 and holes 34. It is also possible to obtain good axial progressivity during operation of the clutch, when the friction pads 24 are in the course of being gripped between the pressure plate 101 and reaction plate 100. This line passes through the centre of the holes 34, and constitutes the axis of symmetry of the horizontal portion of the central zone 21 (FIG. 7) of the fin 30. This arrangement facilitates transverse tilting of the zone 2 about this line, and that is why the holes 34 are formed close to the outer periphery of the lobes 27.

The other friction pad 24 of the same pair is secured directly, without any clearance, to the associated lobe 27 through its support element 23. Due to the elasticity of the lobes 27, this pad is able to follow the movement of the reaction plate in deformation (this movement being smaller than that of the pressure plate 101) under the effect of heat. The support elements 23 may of course be perforated for mounting of the pins 21 in the way described above.

As will be seen from FIG. 3, the minimum surface area of sheet metal necessary for the manufacture of the support 26 in one piece is defined by a square of the flat blank F, the side C of which is substantially equal to the external overall diameter of the support 26. In this method of manufacture, the metal removed during the pressing operation, which is carried out in a press by means of a ram and associated die, is shown cross hatched in FIG. 3 in accordance with the normal convention for drawing components of pressed sheet material. Where (as in the present case) the method is used for making a component in one piece with the fins 30 integral with it, the cut-out or rejected material comprises the central portion (comprising a disc indicated at D), together with the peripheral portion which consists essentially of the four corner areas A.

As is best seen in FIG. 7, each fin 30 extends centrally within a slot 50, with its marginal zone 1 defining a foot joining it to the internal portion 28 of the support. The free end elements of the central zone 2 (i.e. the vertical branches of the H mentioned above) comprise two portions 51 and 52. The portion 52, which is radially inward of the outer portion 51, is tapered and has an edge extending parallel to the edge of the slot 50. In each lobe 27, these edges of the slot are formed respectively on two arms 53. The outer portion 51 of each outer branch of the H shaped fin 30 is wider than the portion 52, and extends in a generally transverse direction. Thus each lobe 27 is generally in the shape of a fork, with a fin 30 being arranged centrally within it.

The radiused edges joining the circumferential ends of the central zone 2 to the horizontal portion of the same zone, and to the folds 3 and 3', will be noted. The free ends of the zone 2 thus enclose between them the outer marginal zone 1' as well as the other zone 1, with the height of the free ends of the central zone 2 being slightly greater than the distance which separates the outer periphery of the outer marginal zone 1' from the outer periphery of the other zone 1. The two folds 3 and 3' extend parallel to the horizontal portion of the central zone 2, which extends radially outside a circumference which passes through the centres of the holes 34 through which the friction pads 24 are secured to the lobes 27. This horizontal portion thus constitutes an anchor zone. It will be appreciated that the central zone 2 is intended to make contact with the friction pad 24.

Figure 4:
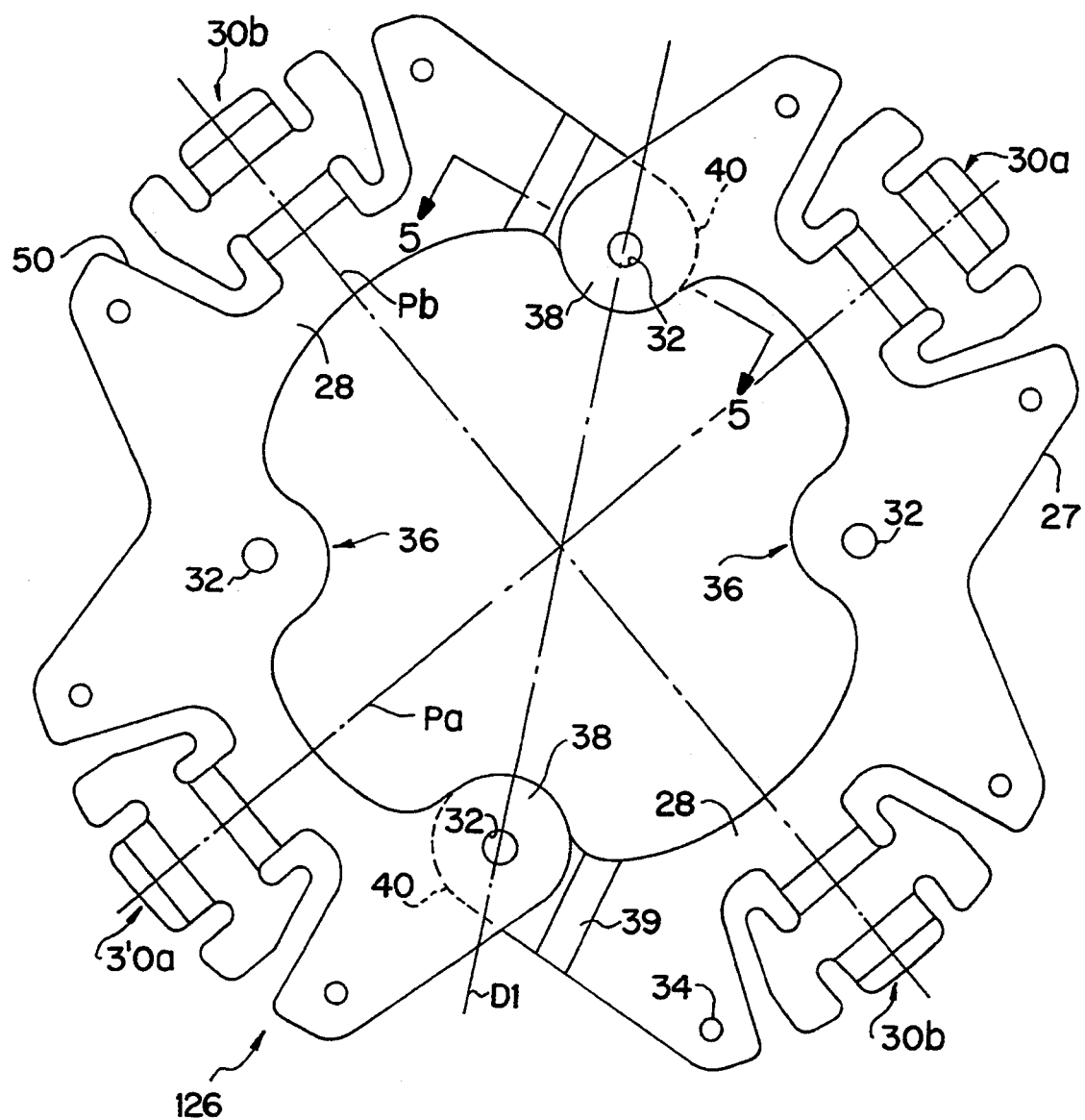
FIG. 4 is a view in elevation showing a support for the clutch friction wheel made in two parts.

Reference is now made to FIG. 4, which shows a two-piece embodiment of the support, 126. This is made in the form of two identical parts 36, so that the internal portion 28 of this support 126 is itself in more than one part. As will be seen from FIG. 4, the internal and external contours of the two-piece disc 126, and its dimensions, are substantially identical to those of the one-piece support shown in FIG. 1. The parts 36 are thinner than the hub plate 12 and the guide ring 16 (FIG. 1).

Each part 36 terminates in two diametrically opposed end portions 38 and 40 in the form of discs, which are superimposed on each other when the parts 36 are assembled together. Each part 36 also has three fastening holes 32, 32' for mounting on the portions 19 of reduced diameter of the spacers 18. As seen in FIG. 5, two of these holes (32') are arranged in the respective diametrically opposed end portions 38 and 40. It will be noted that the portion 40 is offset axially from the main portion of the part 30, through an inclined junction zone 39. The portion 40 of one of the two parts overlies the corresponding portion 38 of the other part, as can clearly be seen in FIG. 5. Thus the pairs of fastening holes 32' constitute assembly holes for assembly of the two parts 36 together, for example by means of the spacers 18.

The four radial fins are identical, and are spaced apart at regular intervals around the disc 126. However, if one part 36 is considered, it is seen that the two fins 30a and 30b are not spaced apart circumferentially in a regular manner along the internal annular half crown 28. In this connection, it is seen that the circumferential distance between the radial fin 30a and the diametral end portion 38 is smaller than the circumferential distance between the radial fin 30b and the diametral end portion 40.

Nevertheless, the radial fins are in fact spaced apart from each other overall at regular intervals once the disc is assembled, because the angle at the centre which separates the median planes Pa and Pb of the two fins 30a and 30b define a right angle between them. The fins 30a and 30b are identical in shape to the fins 30 in FIG. 6.

The arrangement of the support 126 in the form of two identical parts 36, as described above, enables them to be made by a pressing operation in a flat sheet metal blank F in such a way as to produce a significant economy in material, which is greater than 15%. In order to obtain this result, the parts 36 are disposed in the strip of sheet metal in two parallel series of parts. They interpenetrate with each other, and are arranged in head-to-toe relationship with each other, with one series being offset from the other axially.

Thus, the parts in the first series are adjacent, through their respective opposed diametral end portions 38 and 40, and extend in such a way that their assembly and fastening holes 32' are situated substantially on a line parallel to the general direction of the strip of sheet metal material F. In opposition, and symmetrically with the above, the parts in the second series are arranged substantially parallel to the length of the sheet metal. The parts 36 constituting a series of discs 121, made by pressing in this way, are identical to each other, and are thus particularly easy to assemble subsequently on an automatic assembly line.

As will be clear from the description and the accompanying drawings, the profiled fins project from the inner portion 28 of the support 26 or 126 in such a way as to define a wavy support in which: the fins have a central portion with improved flexibility in their free circumferential end portions for contact with one of the pads of a friction liner; and for contact with the other pad of the same friction liner, marginal zones 1, 1', of which the zone 1 projects integrally from the inner portion of the support, while the other marginal outer zone 1', which is more flexible, is mounted freely, being joined to a fold 3' so as closely to follow the movement of the associated friction pad, like the free ends of the central zone 2. The fold 3' is joined to the central zone 2.

The invention is of course not limited to the embodiments described above. It is for example possible to increase the number of parts in the support 126. Thus each disc 126 may consist of three or more parts. This depends on the overall diameter of the support. For instance, if the support has six lobes it can be made in three parts, with two pairs of fastening points 32' and a central fastening point.

The support may consist simply of a guide ring, depending on the magnitude of the torque which is to be transmitted.

The support may be secured to the hub plate 12, which is then mounted so as to be movable in rotation with respect to the hub 10, while the guide rings 16 are then fixed to the hub 10.

The clutch friction disc may be rigid and may be without the springs 14, the support disc then being fixed on the hub plate 12 and the latter being fixed to the hub 10.

What is claimed is:

1. A clutch friction wheel comprising: a support having an inner portion and a plurality of lobes projecting radially from the inner portion and defining slots therein; a plurality of friction liners, each comprising a pair of friction pads, each lobe mounting a said pair of pads back-to-back on either side of the lobe; and a plurality of resilient means, each said resilient means being interposed between two associated said friction pads and disposed in the slots of the lobes; and a pair of shouldered pins associated with each said lobe and securing a first said friction pad of each pair to the associated lobe, said shouldered pins defining a clearance and mounting the other said pad of the same pair for movement within said clearance on the said pins, wherein said resilient means comprise a plurality of profiled fins projecting from said inner portion of the support so as to define a wavy support having a central zone with free circumferential end portions for contact with a first said friction pad of each pair, and marginal zones for contact with the other friction pad of the same pair, with one of said marginal zones projecting from, and being integral with, said inner portion of the support.

2. A clutch friction wheel according to claim 1, wherein said marginal zones of each said profiled fin comprises a first marginal zone and a second marginal zone, the first marginal zone being integral with, and projecting from, said inner portion of the support whereby to constitute a foot of the profiled fin, and wherein a tangential fold joins said central zone to the second marginal zone, whereby said second marginal zone is free.

3. A clutch friction wheel according to claim 1, wherein each said central zone is generally in the shape of an H, defining two vertical branches constituting free circumferential end portions and a horizontal portion joining the vertical branches, with each said profiled fin further defining parallel folds joining said horizontal portion to said marginal zones, the folds being inclined in opposite directions.

4. A clutch friction wheel according to claim 3, wherein each lobe has holes for mounting the shouldered pins, said holes defining a pitch circle, said horizontal portion of said central zone being radially within said pitch circle.

5. A clutch friction wheel according to claim 3, wherein the free end portions of the central zone of each profiled fin comprise a first portion and a second portion radially inward of the first portion, the second portion being of tapered form.

6. A clutch friction wheel according to claim 5, wherein said marginal zones lie between said free end portions of the central zone.

7. A clutch friction wheel according to claim 5, wherein each said lobe has a pair of holes arranged symmetrically for fastening respective ones of a pair of said shouldered pins, the centers of the two holes defining a line passing between them and constituting axis of symmetry of said horizontal portion of the central zone.

8. A clutch friction wheel according to claim 7, wherein said holes are formed adjacent an outer periphery of each said lobe.

* * * * *